United States Patent
Gamble et al.

(10) Patent No.: US 6,730,374 B2
(45) Date of Patent: May 4, 2004

(54) TRIACETYL CELLULOSE FILM WITH REDUCED WATER TRANSMISSION PROPERTY

(75) Inventors: William J. Gamble, Rochester, NY (US); Joseph L. Lippert, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1 day.

(21) Appl. No.: 10/022,765

(22) Filed: Dec. 13, 2001

(65) Prior Publication Data

US 2003/0118754 A1 Jun. 26, 2003

(51) Int. Cl.$^7$ .............................. C08B 3/30; C08K 3/32
(52) U.S. Cl. .................... 428/1.54; 428/1.31; 428/1.33; 536/64; 536/69; 106/171.1; 106/175.1; 106/18.18; 349/96; 349/122; 359/8
(58) Field of Search ............................... 428/1.31, 1.33, 428/1.54; 536/64, 69; 106/171.1, 175.1, 18.18; 349/96, 122; 359/8

(56) References Cited

U.S. PATENT DOCUMENTS

| | | | | |
|---|---|---|---|---|
| 4,217,160 A | * | 8/1980 | Perregaux | 158/239 |
| 4,416,946 A | | 11/1983 | Bolt | 428/421 |
| 4,564,545 A | | 1/1986 | Okumura et al. | 428/76 |
| 5,104,450 A | * | 4/1992 | Sand et al. | 106/177 |
| 5,516,456 A | | 5/1996 | Shinohara et al. | 252/299.01 |
| 6,013,217 A | * | 1/2000 | Hauenstein et al. | 264/169 |
| 6,211,358 B1 | * | 4/2001 | Honda et al. | 536/64 |
| 6,242,631 B1 | * | 6/2001 | Hombek et al. | 558/211 |

OTHER PUBLICATIONS

USSN 09/017787 (D–83661) "Triacetyl Cellulose Film With Reduced Water Transmission Property" by Gamble et al.

* cited by examiner

Primary Examiner—Harold Pyon
Assistant Examiner—Sow-Fun Hon
(74) Attorney, Agent, or Firm—Arthur E. Kluegel

(57) ABSTRACT

Disclosed is a triacetyl cellulose film comprising (a) a triphenyl monophosphate compound and (b) an aromatic polyol-bridged polyphosphate compound. Such a film exhibits a reduced rate of water vapor transmission.

22 Claims, No Drawings

TRIACETYL CELLULOSE FILM WITH REDUCED WATER TRANSMISSION PROPERTY

CROSS REFERENCE TO RELATED APPLICATION

This application is related to an application directed to a TAC film comprising a plasticizer containing a lower alkyl substituted phenyl phosphate ester compound co-filed herewith under Attorney Docket No. 83661/AEK.

FIELD OF THE INVENTION

This invention relates to the field of optical components and, in particular, to protective triacetyl cellulose polymeric films that contain a plasticizer combination including a triphenyl monophosphate compound and an aromatic polyol-bridged polyphosphate compound.

BACKGROUND OF THE INVENTION

Plasticizing agents have long been known to enhance the physical properties of solvent cast cellulose triacetate (also called triacetyl cellulose or TAC) polymeric films. Plasticizers also aid in the release of solvents during the cast sheet formation and drying process. TAC films have found a large market in polarizing plate manufacturing. In this process, dyed and oriented polyvinyl alcohol (PVA) sheets are glued between protective layers of TAC sheet. The acetate cover layers (both sides) protect the active PVA layer from physical damage and environmental agents that could cause chemical degradation to the PVA, with resulting polarization efficiency loss. Water, particularly with heat, can dissolve PVA, potentially altering the active, oriented PVA sheet. A hot, high-humidity environment can result is a dissolution/relaxation of the oriented PVA, and/or degradation of the oriented dye that provides the polarizing effect, with a subsequent loss in polarization efficiency.

Small reductions in moisture or water vapor transmission of the protective layer will improve the life of polarizing plates under normal and high humidity ambient conditions. This attribute is important for liquid crystal displays, which incorporate two polarizing plates that may function in high heat and humidity situations, such as in automobiles.

Many different polymers have been proposed as protective cover layers for the optically active PVA sheet. To date, polymer extrusion has not been able to produce coversheets with the desired low birefringence properties. In general, all current polarizer coversheets are made from solvent cast TAC. Current industry specifications require LCD polarizer coversheets to posses a birefringence of less than 5 nanometers. The advantage of solvent casting is the extremely low stresses exerted on the polymer film as solvent leaves the forming web. Solvent sheet casting contains 20 to 40 percent polymer solids in a suitable solvent. The polymer chains are mobile in the solvent system and the stresses of hopper coating are easily relaxed, on the casting surface prior to solvent removal. Low stresses result in low orientation and the accompanying optical anisotropy.

Extrusion is a melt/cast process. The extrusion die induces stress into the rapidly cooling polymer web. There is little opportunity for polymer relaxation in the quick thermal quenching of the formed sheet. Tentoring can be employed to produce a more stress-balanced sheet. However, results to date have not met the stringent requirements of low birefringence for polarizer coversheets.

TAC polymers have a cellulose chain backbone with varying degrees of acetylation. TAC can range in substitution from approximately 2.4 to 3 acetyl substitution points on the cellulose backbone. Other substitutions on the cellulose backbone could be hydroxyl, propyl or butyl groups. LCD coversheet is made with TAC substitution in the 2.8 to 2.9 range. This degree of acetyl substitution results in optimum polymer properties (such as clarity, physical strength, and polymer solubility.) TAC tends to be high in polymer molecular weight. This is due to the extremely large cellulose chains it is formed from. In the conversion process long cellulose chains are broken down in molecular weight and acetylated. Cellulose chains are helical in nature. The acetyl groups added in conversion to cellulose triacetate add bulky side groups to the polymer chain. This results in a polymer system that has long helical chains with bulky side groups. TAC cannot be thermally extruded, as it does not posses a melting point (it will oxidize first). Hydrogen bonding also plays a role in cellulose sheet formation. Long helical polymer chains, with bulky side groups, combined with rapid hydrogen bonding, results in a polymer system with very low order. TAC is thus a very good polymer for forming amorphous polymer sheet. The fundamental lack of TAC polymer orientation combined with the low stresses of solvent casting, forms a unique polymer system for extremely isotropic LCD coversheets. These fundamental advantages have allowed solvent cast cellulose triacetate to capture the vast majority of LCD coversheet applications.

Low birefringence of protective layers is critical for clarity in liquid crystal displays. Orientation in the coversheet counteracts the specific orientation in the polyvinyl alcohol active layer, damaging the polarization efficiency of the complete package. LCD screens contain two polarizers with four coversheets. Improper orientation in the coversheets will also reduce the focus and clarity of the resulting display. The overriding need for low retardation coversheets has driven the industry to a universal acceptance of TAC sheet but water vapor transmission is a problem.

Solutions have been proposed. U.S. Pat. No. 5,516,456 suggests the use of extruded and solvent cast polynorbornene. Experimentation shows LCD coversheet (80 micron) variations in retardation orientation of +/−5% (40 nanometers). This is far greater than the 5 nanometers typically required for 80 micron LCD coversheet. Polynorbornene has very low moisture absorption, but the optical retardation is too high to meet the requirements of high-grade LCD displays. The patent also states that polyethylene terephthalate and polycarbonate sheets display poor retardation quality, which distorts LCD display images.

An alternative solution is presented in U.S. Pat. No. 4,416,946. In this case a double layer is used to sandwich the polarizing element. In this case, fluorinated polymers are laminated outside of a polyester or cellulose acetate butyrate inner layer. This procedure adds additional expense for manufacturing. An additional layer also causes light path interface, which adds to the diffraction of light, which increases light path retardation, and results in poor LCD screen clarity.

Another proposed solution is covered in U.S. Pat. No. 4,564,545. In this case, the inherently high birefringence of extruded polypropylene and polyethylene is intentionally oriented. The cover sheets are oriented in the same direction as the active polarizer they are laminated with. This approach attempts to intentionally control the effect of optical anisotropy in the coversheets. With a non-orthogonal beam of light, the coversheet will impart orientation to the light before it reaches the polarizing layers. The defect of this approach is that the orientation of the coversheet will make the undistorted viewing angle of the resulting LCD screen very narrow. Another problem with this method is the requirement for exact orientation of the two anisotropic coversheets. If the coversheets are not exactly oriented with each other and the active polarizing layer, there will be a degradation of the polarizer efficiency.

Another way to reduce water vapor transmission is to raise the levels of triphenyl phosphate (TPP), a component often present as a plasticizer in the TAC coversheet. This results in a modest decrease in water vapor transmission for the TAC sheet, but it is not nearly as effective as is desired. More importantly, there are other difficulties with simply increasing the TPP loading in the coversheet. TPP is mobile and migrates to the sheet surface as the sheet surface collapses down during sheet curing. This causes TPP generated dirt problems in the sheet forming machinery. This leads to surface defects and additional machine cleaning expense. A sheet rich in surface TPP may also cause polarizer lamination difficulties and the enriched surface will be more porous and easier to scratch. TAC polarizer coversheets commonly contain 10 to 12 weight percent TPP in the TAC sheet. If this level is raised to 15 weight percent, the mechanical properties of the TAC sheet will fall off undesirably. When tensile properties of the coversheet are reduced through excessive TPP addition, the risk of unwanted polymer stretching is increased. This is not a desirable outcome, as the coversheet will become more vulnerable to stretching/orientation during the routine handling required to form the sheet and the polarizer lamination.

The patent literature suggests several protective materials that might be of use either with or in place of TAC protective film to improve moisture durability. All have very low water vapor transmission rates (WVTR or MVTR, moisture vapor transmission rates) (typically <10 g/(m²-day)). It appears that none of these suggested materials is presently used in the manufacture of polarizers for the LCD market. The superior optical properties of TAC overcome the reduced durability of polarizers manufactured with TAC film, even though it has a water vapor transmission rate of around 400–600 g/(m²-day).

It is a problem to be solved to provide a TAC film that has a reduced rate of water vapor transmission.

SUMMARY OF THE INVENTION

The invention provides a triacetyl cellulose film comprising (a) a triphenyl monophosphate compound and (b) an aromatic polyol-bridged polyphosphate compound. Such a film exhibits a reduced rate of water vapor transmission.

The invention further provides a triacetyl cellulose film comprising (a) an unsubstituted triphenyl phosphate compound and (b) an aromatic diol-bridged polyphosphate compound and more specifically a triacetyl cellulose film comprising a combination plasticizer containing (a) at least 6 wt % of the film of an unsubstituted triphenyl phosphate compound and (b) at least 1% of the film of an aromatic diol-bridged polyphosphate compound.

Further provided are a method of imparting improved water vapor transmission resistance to a triacetyl cellulose film comprising adding the described plasticizing components to a cellulosic dope prior to casting. Also provided are a polarizer element comprising a laminate of the film, a liquid crystal imaging element comprising the polarizer element, and an optical device containing the liquid crystal element.

DETAILED DESCRIPTION OF THE INVENTION

In one embodiment, a film of the invention comprises a triacetyl cellulose (TAC) film comprising (a) a triphenyl monophosphate compound and (b) an aromatic polyol-bridged polyphosphate compound. The TAC film is a polymeric film in which all or a predominant portion of the film is cellulose triacetate. Any known sources or additives may be used in the film. The average acetyl value of the TAC polymer preferably is in the range of 50 to 70%, especially in the range of 55 to 65%. The weight average molecular weight preferably is in the range of 150,000 to 250,000, especially 180,000 to 220,000. The polydispersity index (weight average divided by number average molecular weight) of cellulose acetate is typically in the range of 2 to 7, especially 2.5 to 4. Cellulose acetate may be esterified using a fatty acid such as propionic acid or butyric acid, so long as the acetyl value satisfies the range. Otherwise, cellulose acetate may contain other cellulose esters such as cellulose propionate or cellulose butyrate so long as the acetyl value satisfies the range.

Cellulose acetate film generally contains a plasticizer. Examples of the plasticizers include phosphate esters such as triphenyl phosphate, biphenylyl phenyl phosphate, tricresyl phosphate and cresyl diphenyl phosphate; and phthalate esters such as diethyl phthalate, dimethoxyethyl phthalate, ethyl phthalyl ethyl glycolate, and dimethyl phthalate. The total plasticizer is preferably contained in the film in an amount of not more than 20 wt %, and is generally in the range of 5 to 15 wt %.

Desirably, compound (a) is triphenyl monophosphate or TPP and is unsubstituted. If substituted, any of the substituents identified hereinafter may be employed. Compound (b), the aromatic polyol-bridged polyphosphate compound, is selected to be sufficient to reduce the rate of water vapor transmission of the film compared to the same film without component (b). Specifically useful examples are a bisphenol A bis (diphenyl phosphate), a dibis-phenol A phenyl phosphate, a resorcinol bis (diphenyl phosphate), a diresorcinol phenyl phosphate, and oligomers and mixtures including the foregoing. Mixtures are conveniently employed.

A suitable compound for component (b) is represented by Formula (I):

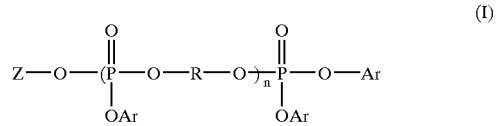

wherein each Ar is an independently selected aromatic group, each R is a substituent containing an independently selected aliphatic, cycloaliphatic or aromatic group, Z is HO—R— or Ar—, and n is 1 to 10. Useful embodiments of the invention include, but are not limited to, those where Z is a phenyl, biphenyl, resorcinol or bis-phenol A group and R is a or a bis-phenol A group or a resorcinol group.

The invention further provides a triacetyl cellulose film comprising (a) a triphenyl monophosphate compound and (b) an aromatic polyol bridged polyphosphate compound, as well as a triacetyl cellulose film comprising a combination plasticizer containing (a) from 55–94 wt % of the plasticizer of an unsubstituted triphenyl phosphate compound and (b) from 6–45 wt % of the plasticizer of an aromatic polyol bridged polyphosphate compound. The invention also provides a method of forming a film having reduced water vapor transmission, a polarizer element, a liquid crystal imaging element, and an optical device containing such a TAC film layer.

The TAC film desirably contains a compound (a) content in an amount of 6–15%, typically 10–12% by wt, of the film.

Component (b) is suitably present in an amount of 1–5%, typically 1–4% by wt, of the film. If desired, the components may comprise more than one compound such as a mixture of compounds of Formula (I) with different values of "n". The film may contain more than one compound with "n" values ranging from 1 to 10. Desirably, the "n" value for the more than one compounds is predominantly 0 and 1.

The TAC film desirably exhibits a birefringence such that the retardation of a 80 micron thick film is less than 5 nm. The film suitably has a degree of acetylation of the triacetyl cellulose of 2.4 to 3, typically 2.7 to 2.9, sites per cellulose unit. The film weight average molecular weight is generally 150.000–250,000, or typically 180,000–220,000.

As shown in the examples, a method of imparting improved water vapor transmission resistance to a TAC film comprises adding the plasticizing components to a cellulosic dope prior to casting.

A polarizer element of the invention comprises a polarizer having a laminate of the film of the invention. A liquid crystal imaging element comprising such a polarizer. An optical device of the invention contains such a liquid crystal element.

LCD coversheet water vapor transmission rates are important for the stability of polarizing plates at high humidity and temperature conditions. The TAC coversheets are needed to protect the water soluble PVA polarizer from relaxation/dissolution and the resulting loss of polarization efficiency.

Additional TPP will marginally lower moisture transmission in the TAC coversheet, but TPP migration is a function of sheet concentration. TPP levels over 11% in the sheet will lead to excessive TPP bloom on the TAC sheet surface. This causes surface defects and the resulting coversheet is more prone to scratching. The alternative plasticizers tested here showed no tendency to migrate to the sheet surface and create beauty defects.

Of the plasticizers tested, oligomeric bis-diphenyl phosphate compounds were successful in reducing WVTR in the fully dried sheet (and also with the 2 to 3 wt % residual solvents as the raw processed sheet). A particularly good plasticizer is oligomeric bis-phenol A with bis-diphenyl ends. This large molecule has low mobilty and hence little surface migration. It has the unexpected result of significantly lowering WVTR for the TAC coversheet.

The use of a combined amount of TPP and addenda exceeding 15 wt % is generally undesirable due to the loss of tensile strength which limits the ability to stretch the film.

Unless otherwise specifically stated, use of the term "group", "substituted" or "substituent" means any group or atom other than hydrogen. Additionally, when reference is made in this application to a compound or group that contains a substitutable hydrogen, it is also intended to encompass not only the unsubstituted form, but also its form further substituted with any substituent group or groups as herein mentioned, so long as the substituent does not destroy properties necessary for the intended utility. Suitably, a substituent group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, cyclohexyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine); imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired desirable properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

The invention may be used in conjunction with any liquid crystal display devices, typical arrangements of which are described in the following. Liquid crystals (LC) are widely used for electronic displays. In these display systems, an LC layer is typically situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell and is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials that transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film, it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

EXAMPLES

Sample films were prepared to compare the rate of water vapor transmission experienced using various addenda in combination with triphenylphosphate. The samples were prepared as follows:

The samples were prepared by uniformly mixing 69.8 wt % methylene chloride, 8 wt % methanol, 2 wt % butanol, 18 wt % cellulose triacetate and 2.2 percent triphenyl phosphate. The material was stirred under heat (90 degrees C.) and pressure exerted by the vapor pressure of the solvent mixture (a sealed vessel at 3.5 kg/cm$^2$ gauge (50 psig)), for 8 hours. This resulting cellulose dope was filtered and placed in a apparatus where it could be pumped. An injection port, with a separate pump, was used to add a mixture of 50 wt % methylene chloride and 50 wt % addenda compounds. This injection was metered off a precision scale to add 2 or 4 weight % plasticizer (as compared to the dry sheet CTA+TPP) to the flowing dope stream. The dope stream then was passed through 4 static mixers which produced a homogeneous dope solution. The dope solution was cast from a hopper (die) onto a highly polished casting drum. The solvent was evaporated and the cast film was stripped from the casting surface after approximately 2 minutes of drying time. The sample sheet was subjected to further drying in a forced air oven at 125 degrees C. Samples were then monitored for dryness by GC headspace measurements.

To explore the possibility that a particular plasticizer type would provide advantage as a "WVTR reducer", an experiment was conducted using various alternative co-plasticizers at 2% and 4% levels added to a dope that contains 11 percent TPP. The resulting samples were dried and tested. The water vapor transmission rates (WVTR) were obtained using ASTM test method F1249 from a Mocon 3/31 water vapor transmission testing system utilizing a 5 cm$^2$ permanent metal mask with known testing conditions of 37.8° C. and 100% RH. Duplicate measurements were averaged after 15 hrs.

Compound b-1 used herein is supplied by Akzo Nobel Chemicals, Inc. as Fyroflex® BDP and is a mixture comprising 75–95 wt % of bisphenol-A-bis-(diphenyl phosphate); 5–20 wt % of oligomers of the foregoing; and 1–5 wt % of TPP.

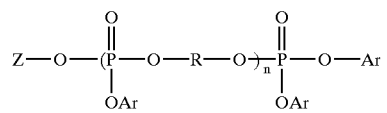

(I)

TABLE I

| Sample | Plasticizer: Component (a) + Component (b) | Avg WVTR g/m²/day | Avg WVTR g/m²/day/ mm film thickness |
|---|---|---|---|
| 1 | 11% TPP* + None-(Check) | 574 | 42.3 |
| 2 | 11% TPP + None (Check) | 568 | 44.7 |
| 3 | 11% TPP + 2% TPP (Comp) | 561 | 42.7 |
| 4 | 11% TPP + 4% TPP (Comp) | 532 | 39.2 |
| 5 | 11% TPP + 2% Santicizer 2148** (Comp) | 570 | 41.3 |
| 6 | 11% TPP + 4% Santicizer 2148** (Comp) | 517 | 39.4 |
| 7 | 11% TPP + 2% isodecyl benzoate (Comp) | 576 | 40.9 |
| 8 | 11% TPP + 4% isodecyl benzoate (Comp) | 499 | 36.8 |
| 9 | 11% TPP + 2% Diundecyl Phthalate (Comp) | 583 | 43.0 |
| 10 | 11% TPP + 4% Diundecyl Phthalate (Comp) | 537 | 38.2 |
| 11 | 11% TPP + 2% Dibutyl Phthalate (Comp) | 514 | 38.5 |
| 12 | 11% TPP + 4% Dibutyl Phthalate (Comp) | 535 | 40.1 |
| 13 | 11% TPP + 2% b-1 (Inv) | 509 | 36.2 |
| 14 | 11% TPP + 4% b-1 (Inv) | 482 | 35.5 |

*triphenylphosphate
**Santicizer ® 2148 is a mixed C-12–C16 alkyl diphenyl phosphate ester supplied by Solutia, Inc.

The results show that the combination of the invention (samples 13 and 14) provides a reduced water vapor transmission rate compared to the check samples 1 and 2 with no component (b) and compared to samples 3–12 containing alternative addenda in place of component (b).

The entire contents of the patents and other publications referred to in this specification are incorporated herein by reference.

What is claimed is:

1. An optical component containing a triacetyl cellulose film exhibiting improved resistance to water vapor transmission comprising (a) a triphenyl monophosphate compound in an amount of 6–15 wt % of the film and (b) an aromatic polyol-bridged polyphosphate compound in an amount of 1–5 wt % of the film, components (a) and (b) being present in amounts sufficient to improve the resistance of the film to water vapor transmission compared to the same film without components (a) and (b).

2. The optical component of claim 1 wherein compound (b) is a bis-(diphenyl phosphate) compound.

3. The component of claim 2 wherein compound (b) is an aromatic diol-bridged bis-(diphenyl phosphate) compound.

4. The component of claim 2 wherein the polyol of compound (b) is a resorcinol bridged bis-(diphenyl phosphate) compound.

5. The component of claim 2 wherein the polyol of compound (b) is a bis-phenol A compound.

6. The component of claim 1 wherein compound (b) is represented by formula (I):

wherein each Ar is an independently selected aromatic group, each R is a substituent containing an independently selected aliphatic, cycloaliphatic or aromatic group, Z is HO—R— or Ar—, and n is 1 to 10.

7. The component of claim 1 wherein R is a bis-phenol A group.

8. The component of claim 1 wherein R is a resorcinol group.

9. The component of claim 1 wherein the total amount of compounds (a) in the film is 10–12% by wt. of the film.

10. The component of claim 1 wherein the total amount of compounds (b) in the film is 1–4% by wt. of the film.

11. The component of claim 1 wherein the film comprises more than one compound (b).

12. The component of claim 6 wherein the film comprises more than one compound of Formula (I).

13. The component of claim 12 wherein at least two of the compounds of Formula (I) have different values of "n".

14. The component of claim 13 wherein the values for n for two of the compounds includes values of 1 and 2.

15. The component of claim 13 wherein the values for n for the more than one compounds is predominantly 1 and 2, based on a wt % calculation of all the compounds of Formula (I).

16. The component of claim 1 wherein the triacetyl cellulose film exhibits a birefringence such that the retardation of a 80 micron thick film is less than 5 nm.

17. The component of claim 1 wherein the degree of acetylation of the triacetyl cellulose is 2.4 to 3 sites per cellulose unit.

18. The component of claim 1 wherein the degree of acetylation of the triacetyl cellulose is 2.7 to 2.9 sites per cellulose unit.

19. The component of claim 1 wherein the weight average molecular weight of the triacetyl cellulose is 150,000–250,000.

20. The component of claim 19 wherein the weight average molecular weight of the triacetyl cellulose is 180,000–220,000.

21. The component of claim 1 that is a polarizer element.

22. The component of claim 1 that is a liquid crystal imaging element.

* * * * *